(12) United States Patent
Chen et al.

(10) Patent No.: US 7,093,116 B2
(45) Date of Patent: Aug. 15, 2006

(54) METHODS AND APPARATUS TO OPERATE IN MULTIPLE PHASES OF A BASIC INPUT/OUTPUT SYSTEM (BIOS)

(75) Inventors: Lechong Chen, Shanghai (CN); Lei Wang, Shanghai (CN); Xiang Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 10/424,937

(22) Filed: Apr. 28, 2003

(65) Prior Publication Data

US 2004/0215951 A1    Oct. 28, 2004

(51) Int. Cl.
*G06F 15/177* (2006.01)
(52) U.S. Cl. .......................................................... 713/1
(58) Field of Classification Search ..................... 713/1
See application file for complete search history.

(56) References Cited

U.S. PATENT DOCUMENTS

| | | | |
|---|---|---|---|
| 5,630,076 A * | 5/1997 | Saulpaugh et al. | 710/104 |
| 5,999,989 A * | 12/1999 | Patel | 710/1 |
| 6,816,963 B1 * | 11/2004 | Krithivas et al. | 713/1 |
| 2003/0056090 A1 * | 3/2003 | Khanna et al. | 713/1 |
| 2004/0088531 A1 * | 5/2004 | Rothman | 713/1 |
| 2004/0107424 A1 * | 6/2004 | Wang | 719/321 |
| 2004/0158698 A1 * | 8/2004 | Rothman et al. | 713/1 |
| 2004/0158828 A1 * | 8/2004 | Zimmer et al. | 717/168 |

* cited by examiner

*Primary Examiner*—Chun Cao
(74) *Attorney, Agent, or Firm*—Hanley, Flight & Zimmerman, LLC

(57) ABSTRACT

Methods and apparatus to operate in multiple phases of a basic input/output system (BIOS) are described herein. In an example method, an initialization driver retrieves resources associated with a plurality of phases of the BIOS from an initialization library to initialize a platform. Based on the resources, the initialization driver is executed in a first phase and a second phase of the BIOS.

23 Claims, 4 Drawing Sheets

METHODS AND APPARATUS TO OPERATE IN MULTIPLE PHASES OF A BASIC INPUT/OUTPUT SYSTEM (BIOS)

TECHNICAL FIELD

The present disclosure relates generally to firmware, and more particularly, to methods and apparatus to operate in multiple phases of a basic input/output system (BIOS).

BACKGROUND

The initial phases of computer or processor system operation (i.e., prior to the booting of an operating system by the processor system) following a power-up or a reset are controlled by a basic input/output system (BIOS). In general, the BIOS is implemented as software or firmware in the form of machine readable instructions that are stored in a non-volatile memory coupled to a processor. Following a reset operation or the application of power to the processor, the processor executes the BIOS instructions. Typically, the BIOS performs one or more hardware and software configuration and test activities prior to booting the operating system. The configuration activities carried out by the BIOS are responsible for establishing the manner in which hardware devices (e.g., disk drives, video controllers, keyboard, mouse, etc.) associated with the processor system interact with the operating system executed by the processor system. The test activities collect system configuration information that may be later used, for example, by the operating system to determine that hardware or devices associated with the system are ready for use and to facilitate debugging activities, configuration management activities, etc.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in dedicated hardware, exclusively in software, exclusively in firmware or in some combination of hardware, software, and/or firmware.

To assist the BIOS in managing data flow, an extensible firmware interface (EFI) is used to define an interface between operating systems and platform firmware. The EFI consists of data tables containing platform-related information. The EFI also includes boot and runtime service calls that are available to the operating system. Accordingly, the EFI provides a standard environment for booting an operating system and running pre-boot applications. Additional information pertinent to the EFI is available at http://developer.intel.com/technology/efi.

An EFI-based BIOS initializes a platform (i.e., a computer or processor system including hardware and an operating system) in a phased fashion. Windows XP® operating on personal computers is an example of a platform. The EFI-based BIOS initializes the platform in two phases: a pre-EFI initialization (PEI) phase and a driver execution environment (DXE) phase. In the PEI phase, a PEI module (PEIM) configures the platform with minimum resources to enable the DXE phase. Following the configuration carried out by the PEI, a DXE driver uses DXE services to configure the platform into a final pre-boot state. For example, during memory initialization on a platform having one gigabyte (1 GB) of memory, a memory PEIM may be configured to initialize 256 megabyte (MB), which is sufficient memory to enable the DXE phase. Accordingly, a memory DXE driver may be configured to enable the balance of the memory (i.e., 744 MB) in the DXE phase prior to booting the operating system.

Typically, PEIMs and DXE drivers are manufactured by different vendors. Further, the PEIMs and the DXE drivers provide different services and operate in different execution environments (e.g., different phases of the BIOS). As a result, PEIMs and DXE drivers are incompatible, and a number of modules and drivers are need to operate in different phases of the BIOS).

Figure 1:
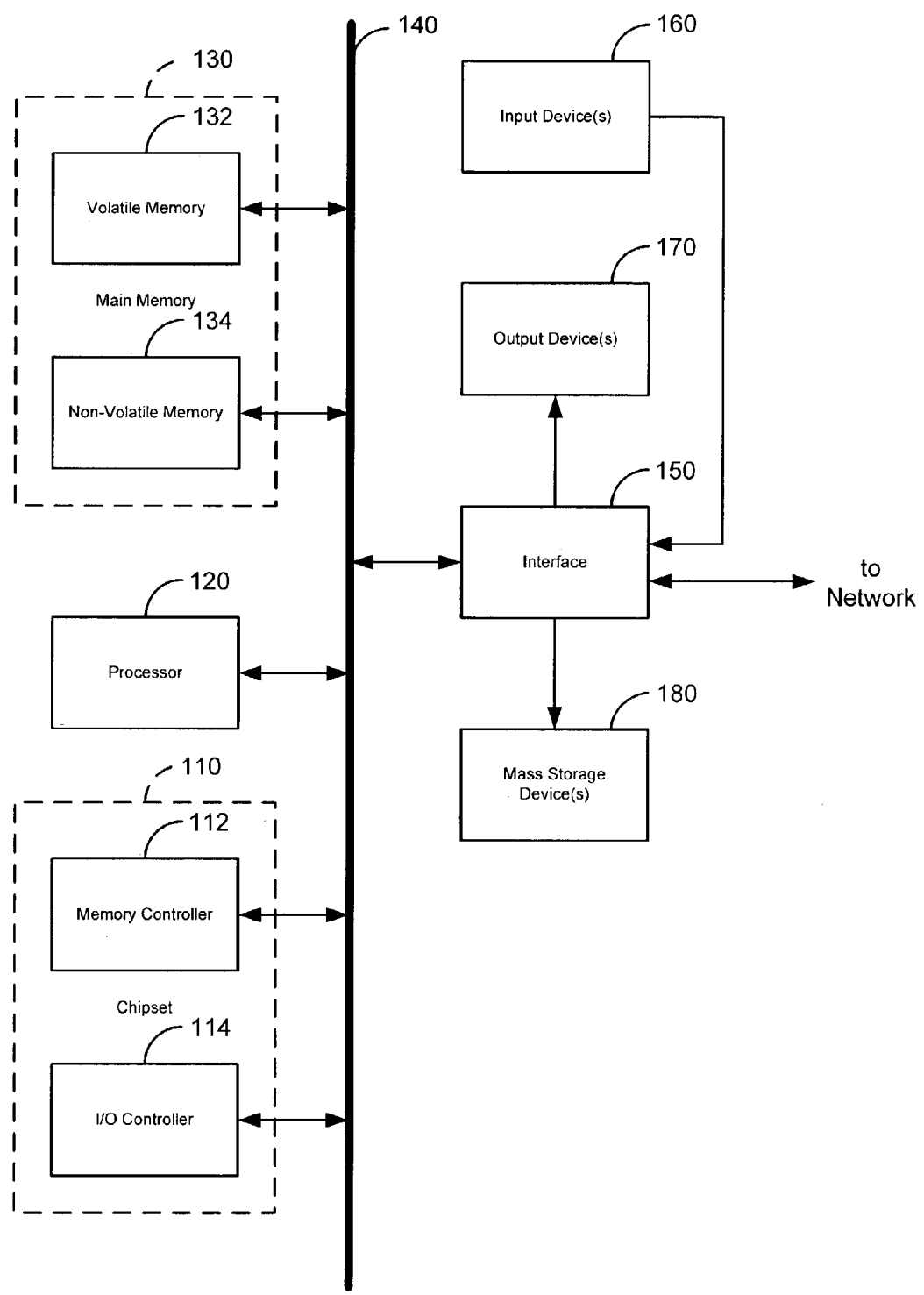
FIG. 1 is block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance or any other type of computing device.

The processor system 100 illustrated in FIG. 1 includes a chipset 110, which includes a memory controller 112 and an input/output (I/O) controller 114. As is well known, a chipset typically provides memory and I/O management functions, as well as a plurality of general purpose and/or special purpose registers, timers, etc. that are accessible or used by a processor 120. The processor 120 is implemented using one or more in-order processors. For example, the processor 120 may be implemented using one or more of the Intel® Pentium® family of microprocessors, the Intel® Itanium® family of microprocessors, and/or the Intel XScale® family of processors. In the alternative, other processors or families of processors may be used to implement the processor 120.

As is conventional, the memory controller 112 performs functions that enable the processor 120 to access and communicate with a main memory 130 including a volatile memory 132 and a non-volatile memory 134 via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented using flash memory, Read Only Memory (ROM), Electrically Erasable Programmable Read Only Memory (EEPROM), and/or any other desired type of memory device.

The processor system 100 also includes a conventional interface circuit 150 that is coupled to the bus 140. The interface circuit 150 may be implemented using any type of well known interface standard such as an Ethernet interface, a universal serial bus (USB), a third generation input/output interface (3GIO) interface, and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes, among other things, a graphics driver card.

The processor system 100 also includes one or more mass storage devices 180 configured to store software and data. Examples of such mass storage device(s) 180 include floppy disks and drives, hard disk drives, compact disks and drives, and digital versatile disks (DVD) and drives.

The interface circuit 150 also includes a communication device such as a modem or a network interface card to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180 and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
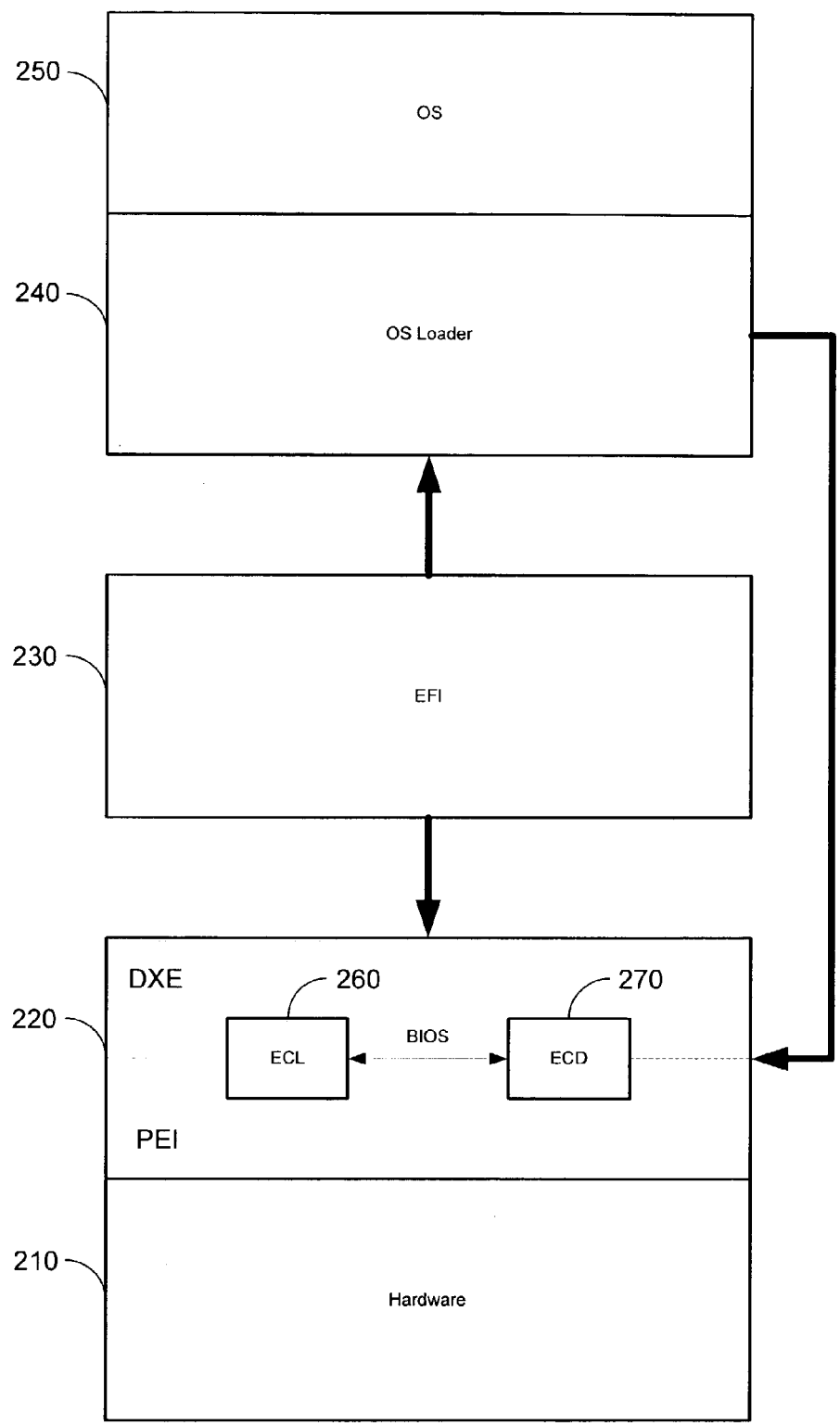
FIG. 2 is a block diagram representation of an example architectural hierarchy of the example processor system shown in FIG. 1.

In the example of FIG. 2, the illustrated architectural hierarchy 200 of the processor system 100 includes hardware 210, a BIOS 220, an extensible firmware interface (EFI) 230, an operating system (OS) loader 240, and an operating system (OS) 250.

Persons of ordinary skill in the art will readily recognize that hardware 210 may include any physical aspect of the processor system 100 such as the processor 120 and the main memory 130. Hardware 210 also includes the interface circuit 150, input device(s) 160, output devices 170, and/or the mass storage device 180. Basically, hardware 210 is any or all of the components shown in FIG. 1. The BIOS 220 may be implemented as software, firmware or machine readable instructions configured to boot up (i.e., start up) the processor system 100 in a conventional manner. To boot the operating system 250 (e.g., Microsoft Windows®) and to run pre-boot applications, the BIOS 220 manages data flow between the OS loader 240 and the hardware 210 of the computer system 100 via the EFI 230.

In the example of FIG. 2, the BIOS 220 includes an EFI combination library (ECL) 260 and an EFI combination driver (ECD) 270. For example, the ECL 260 may be a static link library configured to perform a variety of operations such as input/output (I/O), memory, peripheral component interconnect (PCI) access, specific central processing unit (CPU) instructions execution and EFI core services, and/or protocols access. The ECL 260 also dynamically resolves different driver execution environments and provides a universal interface to the ECD 270. The ECL 260 may be platform neutral (i.e., platform agnostic) so that the ECL 260 does not assume a specific platform feature. Further, the ECL 260 is phase adaptive to provide across-platform system services. To illustrate these concepts, the ECL 260 may perform operations such as input/output, memory, and PCI access by utilizing the PEI services in the PEI phase. In addition to its PEI phase operations, the ECL 260 may also perform the operations mentioned above by utilizing the DXE services in the DXE phase. Accordingly, the ECL 260 provides cross-phase services to the ECD 270.

The ECD 270 may operate in either the PEI phase or the DXE phase to perform platform initialization. That is, the ECD 270 may operate as a PEIM in the PEI phase and a DXE driver in the DXE phase.

As noted above, the ECL 260 provides functions such as PCI configuration accessing functions, I/O accessing functions, and/or memory operation functions. By being in communication with the ECL 260, the ECD 270 does not directly use any particular service provided by a particular phase, but links and uses the functions of the ECL 260. The ECD 270 retrieves the result of a service call provided by the ECL 260. For example, the ECD 270 may request a read to certain PCI configuration space by calling a service provided by the ECL 260. In such operation, the ECL 260 executes the request and retrieves the value for the ECD 270. As result, the ECD 270 may operate in different phases of the BIOS 220 (e.g., in the PEI phase and in the DXE phase).

Figure 3:
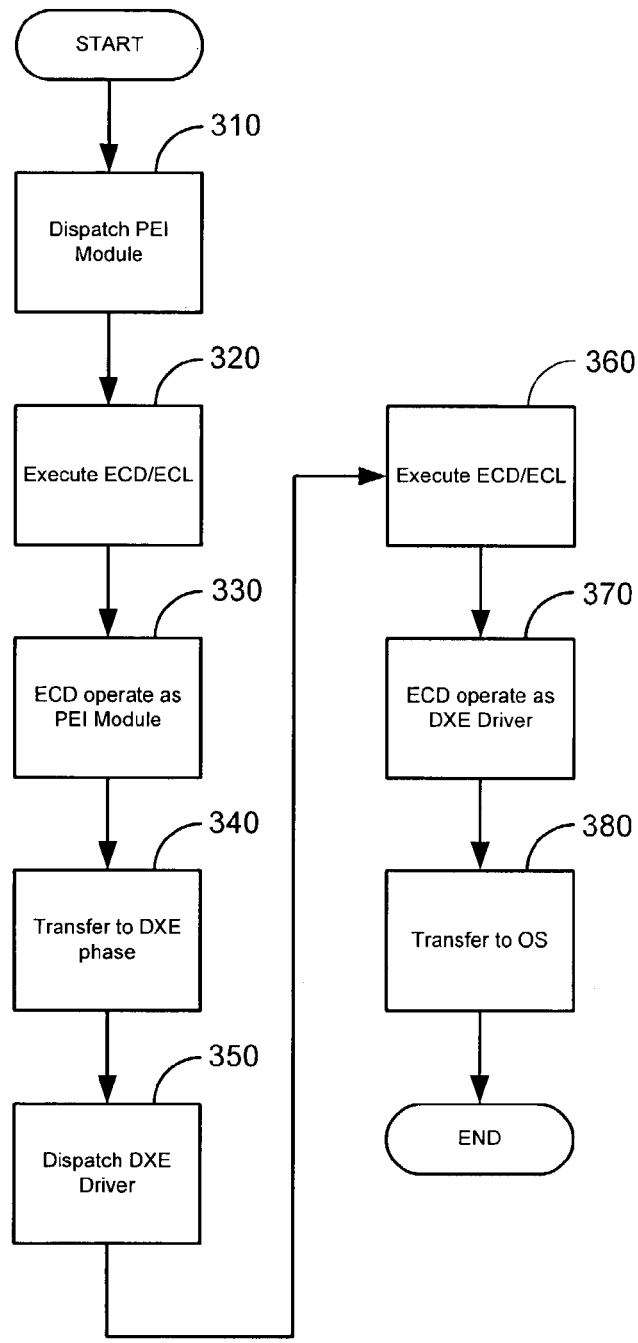
FIG. 3 is a flow diagram representation of example machine readable instructions that may operate in multiple phases of a BIOS.

Example machine readable instructions that may be executed by the processor system 100 (e.g., via the processor 120) are represented in a flow chart in FIG. 3. Persons of ordinary skill in the art will appreciate that the machine readable instructions can be implemented in any of many different ways utilizing any of many different programming codes stored on any of many computer-readable mediums such as a volatile or non-volatile memory or other mass storage device (e.g., a floppy disk, a CD, and a DVD). Further, although a particular order of instructions is illustrated in FIG. 3, persons of ordinary skill in the art will appreciate that these instructions can be performed in other temporal sequences. Again, the flow chart 300 is merely provided as an example of one way to program the processor 120 to operate in multiple phases of the EFI-based BIOS 220.

In the example of FIG. 3, the EFI-based BIOS 220 operates in the PEI phase first and then in the DXE phase of the illustrated normal boot path 300 (i.e., PEI→DXE→OS). The EFI-based BIOS 220 first dispatches a PEIM in the PEI phase (block 310) during which the EFI-based BIOS 220 may initialize a platform (i.e., a computer or processor system including hardware and an operating system such as Windows XP®) with minimum resources to enable the DXE phase. In the PEI phase, the EFI-based BIOS 220 may initialize the platform with a configuration to permit execution of the DXE phase while a DXE driver creates the final pre-boot state. Thus, the DXE driver may continue or overwrite platform settings initialized by the PEIM. During a memory initialization on a platform installed with one gigabyte (GB) memory, for example, a memory PEIM may be configured to initialize 256 megabyte (MB) to enable the DXE phase. Accordingly, a memory DXE driver may be configured to enable the rest of the memory (i.e., 744 MB) in the DXE phase.

The ECD 270 is in communication with the ECL 260 to retrieve initialization resources such as driver execution environments and interfaces (block 320). The ECD 270 then operates as a PEIM to partly and/or temporarily configure hardware 210 (e.g., a keyboard or a mouse) and/or other devices associated with the processor system 100 (block 330). Because the EFI-based BIOS 220 operates in the PEI phase and the DXE phase in serial manner, the EF-based BIOS 220 then transfers to the DXE phase (block 340). In the DXE phase, the EFI-based BIOS 220 dispatches a DXE driver (block 350). The ECD 270 is then invoked for a second time in the DXE phase (block 360). In particular, the ECD 270 operates as a DXE driver to fully initialize hardware and/or devices associated with the processor system 100 to the final pre-boot stage (block 370). After initializing the platform, the EFI-based BIOS 220 transfers control to the operating system 250 to load files and/or configurations into the main memory 130 to boot up the processor system 100 in a conventional manner (block 380).

Alternatively, the ECD 270 may operate in the DXE phase first and then in the PEI phase. Here, the ECD 270 enables the processor system 100 to operate as efficiently as possible. In particular, the EFI-based BIOS 220 may include an Advanced Configuration and Power Interface (ACPI), which is a BIOS-based power management system. ACPI uses device activity timeouts to determine when to transition the processor system 100 into one or more low power, or sleep, states in which the processor system 100 consumes a reduced quantity of current. For example, the ACPI specification (i.e., the Advanced Configuration and Power Interface Specification, Revision 2.0b, published Oct. 11, 2002) defines five sleep states that are referred to as S1, S2, S3, S4, and S5.

Although persons of ordinary skill in the art will readily appreciate the details of the various processor sleep states, a brief description of each sleep state is provided for convenience. The S1 sleep state is a low wake latency sleeping state. In the S1 state, no system context is lost in either the processor or any associated processor chipset, and hardware maintains all system context.

The S2 sleep state is similar to the S1 sleep state except that in the S2 sleep state, the processor and system cache context is lost; the operating system is responsible for maintaining the processor and caches context. When a wake event is detected by a processor that is in an S2 sleep state, the processor begins execution from the processor's waking vector.

The S3 sleep state is a low wake latency sleeping state in which all system context is lost except system memory. The processor, cache, and chipset contexts are lost in this state. However, hardware maintains a memory context and restores some processor and other configuration contexts. As with the S2 sleep state, control starts from the processor's waking vector after the wake event.

The S4 sleep state is the lowest power, longest wake latency sleeping state supported by ACPI. To reduce power consumption to a minimum, it is assumed that the hardware platform has powered off all devices in the S4 sleep state. Platform context is maintained.

The S5 sleep state is similar to the S4 sleep state except that the operating system does not save any context. The system is in the "soft" off state and requires a complete boot when it wakes. Software uses a different state values to distinguish between the S5 state and the S4 state to allow for initial boot operations within the BIOS to distinguish whether or not the boot is going to wake from a save memory image.

As described in detail below, the disclosed system enables the processor system 100 to sleep (i.e., enter a low power state) and to awaken from the low power state. Although the disclosed system is particularly advantageous when used in conjunction with the S3 state, the low power state may be any one of the S1 through S5 states defined by the ACPI specification. In the S3 state, for example, the processor system 100 appears to be off because the power supply is in a reduced power mode, and the volatile memory 132 (e.g., RAM) is in slow refresh.

Figure 4:
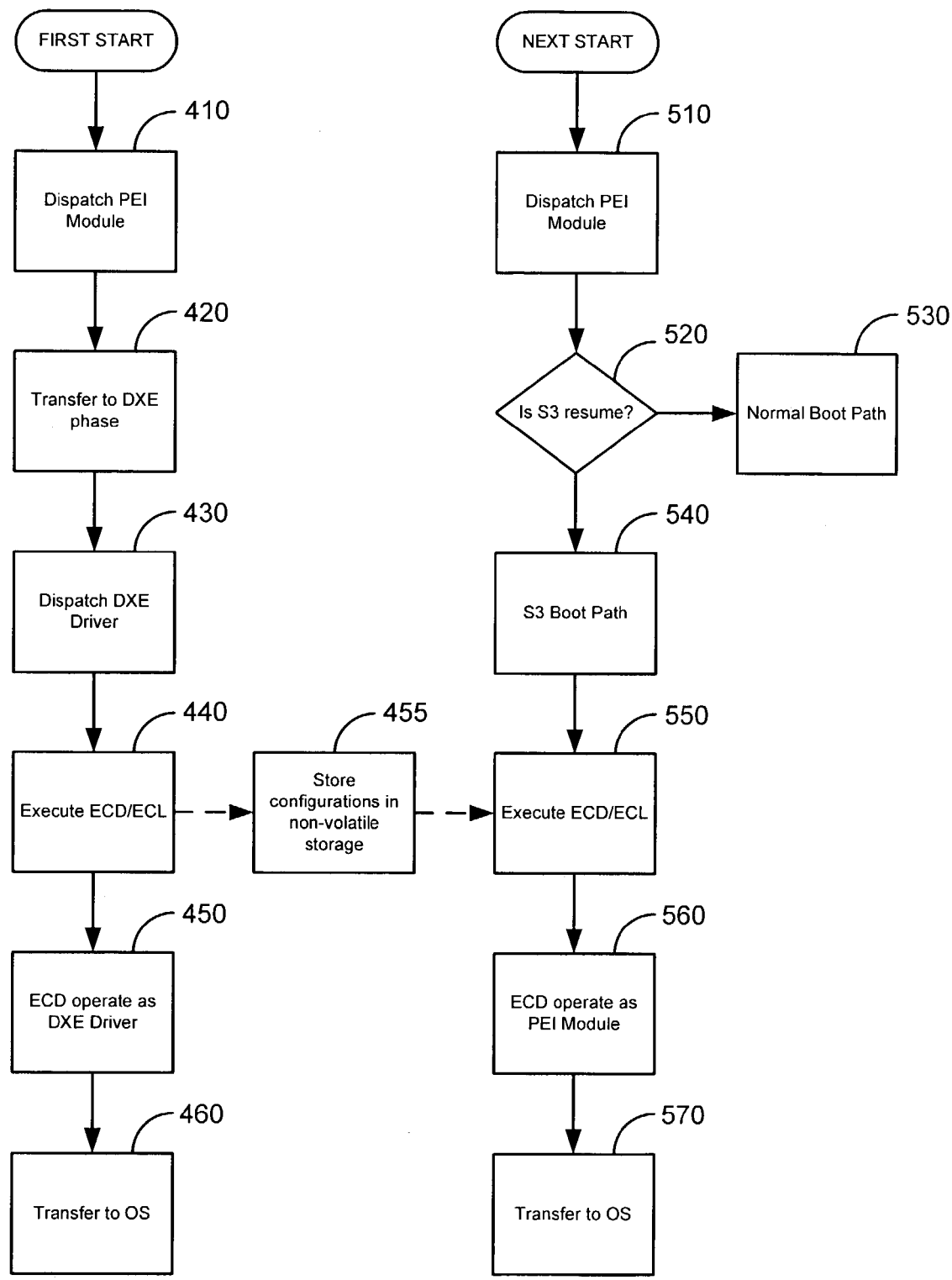
FIG. 4 is a flow diagram representation of alternative machine readable instructions that may operate in multiple phases of a BIOS.

In the example of FIG. 4, the ECD 270 operates in the DXE phase first and then in the PEI phase of the illustrated normal boot path. The EFI-based BIOS 220 begins the initialization process of the processor system 100 by dispatching a PEIM with minimum resources to enable the DXE phase (block 410). The EFI-based BIOS 220 then transfers to the DXE phase (block 420) and dispatches a DXE driver (block 430). As noted above, the ECD 270 is in communication with the ECL 260 to retrieve initialization resources (i.e., across-phase system services) (block 440). Accordingly, the ECD 270 operates as a DXE driver in a normal boot path (block 450). Further, the ECD 270 stores a copy of the configurations is stored in a non-volatile storage (e.g., an ACPI reclaimed memory) for later use as described below (block 455). By having a single component in the ECD 270 configure to operate as either a PEIM or a DXE driver, one copy of a large-scale code may reused in different phases of the EFI-based BIOS 220. Further, the ECD 270 also reduces code size because the ECD 270 reuses the same code to operate. The EFI-based BIOS 220 then transfers to the operating system 250 to load files and/or configurations into the main memory 130 to boot up the processor system 100 in a conventional manner (block 460).

The processor system 100 may fall into a sleep state as defined by the ACPI specification (e.g., the S3 state). After a wake event (e.g., pressing a key on a keyboard), the EFI-based BIOS 220 dispatches a PEI module (block 510) and determines whether the processor system 100 is resuming from the S3 state (block 520). If the processor system 100 is not resuming from the S3 state then the EFI-based BIOS 220 proceeds to operate in a normal boot path (e.g., shown as flow chart 300 in FIG. 3) (block 530). Alternatively, in the S3 resume boot path, the EFI-based BIOS 220 restores both configurations executed in the PEI phase and the DXE phase (block 540). To invoke all DXE drivers is ineffective because of the time constraint of required by the S3 resume boot path. For example, the Microsoft® Windows Hardware Quality Labs (WHQL) procedure certifies that hardware for peripherals and other components is compatible with Microsoft Windows® operating systems. In particular, WHQL specifies that the time to resume from the S3 state is less than or equal to 0.5 seconds. Based on the configurations stored in the non-volatile storage, the ECD 270 is invoked during the PEI phase to restore system configuration. Accordingly, any operation required of a DXE driver is implemented by the ECD 270 to satisfy such as a requirement (block 550). As a result, dispatch of the DXE driver in the DXE phase is avoided to save boot time because the ECD 270 uses the configurations stored in the non-volatile storage. The EFI-based BIOS 220 then transfers to the operating system 250 to load files and/or configurations into the main memory 130 to boot up the processor system 100 in a conventional manner (block 560).

The methods and apparatus disclosed herein are particularly well suited for use with Microsoft Windows®. However, the teachings of the disclosure may be applied to other platforms without departing from the scope or spirit thereof. Because the ECL 260 and the ECD 270 are platform independent, the ECL 260 and the ECD 270 may be implemented on different platforms and processor architectures.

While the methods and apparatus described herein are particularly well suited for an EFI-based BIOS, the processor system 100 may include a non-EFI-based BIOS. For example, the processor system 100 may include a non-EFI-based BIOS that initializes a platform in a phase fashion.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to operate in multiple phases of a basic input/output system (BIOS), the method comprising:
   retrieving resources to initialize a platform from an initialization library, the initialization library configured to provide resources associated with a plurality of phases of the BIOS;
   executing an initialization driver associated with the initialization library in a first phase of the BIOS based on the resources; and
   executing the initialization driver in a second phase of the BIOS based on the resources.

2. A method as defined in claim 1, wherein retrieving resources to initialize the platform from the initialization library comprises retrieving resources to initialize the platform from an extensible firmware interface (EFI) combination library configured to provide resources associated with one of a pre-EFI (PEI) phase and a driver execution environment (DXE) phase.

3. A method as defined in claim 1, wherein retrieving resources to initialize the platform from the initialization library comprises retrieving resources associated with one of a peripheral component interconnect (PCI) configuration space accessing function, an input/output accessing function, and a memory operation function.

4. A method as defined in claim 1, wherein executing the initialization driver in the first phase of the BIOS based on the resources comprises executing an extensible firmware interface (EFI) driver in one of a pre-extensible firmware interface (PEI) phase and a driver execution environment (DXE) phase of an EFI-based BIOS.

5. A method as defined in claim 1, wherein executing the initialization driver in the second phase of the BIOS based on the resources comprises executing an extensible firmware interface (EFI) driver in one of a driver execution environment (DXE) phase and a pre-EFI (PEI) phase of an EFI-based BIOS.

6. A method as defined in claim 1, wherein executing the initialization driver in the second phase of the BIOS based on the resources comprises executing an extensible firmware interface (EFI) combination driver in a driver execution environment (DXE) phase during a resume boot path of a sleep state associated with the Advanced Computer Power Interface (ACPI) protocol.

7. A processor system comprising:
   an initialization library configured to provide resources associated with a plurality of phases of a basic input/output system (BIOS) to initialize a platform; and
   an initialization driver in communication with the initialization library, the initialization driver being configured to operate in the plurality of phases associated with the BIOS based on the resources from the initialization library.

8. A processor system as defined in claim 7, wherein the initialization library comprises an extensible firmware interface (EFI) combination library configured to provide resources associated with one of a pre-EFI (PEI) phase and a driver execution environment (DXE) phase of an EFI-based BIOS.

9. A processor system as defined in claim 7, wherein the initialization library comprises an extensible firmware interface (EFI) combination library configured to provide resources associated with one of a peripheral component interconnect (PCI) configuration space accessing function, an input/output accessing function, and a memory operation function.

10. A processor system as defined in claim 7, wherein the initialization driver comprises an extensible firmware interface (EFI) combination driver configured to operate in a pre-EFI (PEI) phase and a driver execution environment (DXE) phase.

11. A processor system as defined in claim 7, wherein the initialization driver comprises an extensible firmware interface (EFI) driver configured to operate in a driver execution environment (DXE) phase during a resume boot path of a sleep state associated with the Advanced Computer Power Interface (ACPI) protocol.

12. A machine readable medium storing instructions, which when executed, cause a machine to:
    retrieve resources to initialize a platform from an initialization library configured to provide resources associated with a plurality of phases of a basic input/output system (BIOS);
    execute an initialization driver associated with the initialization library in a first phase of the BIOS based on the resources; and
    execute the initialization driver in a second phase of the BIOS based on the resources.

13. A machine readable medium as defined in claim 12, wherein the instructions to cause the machine to retrieve resources to initialize the platform from the initialization library by retrieving resources associated with one of a pre-EFI (PEI) phase and a driver execution environment (DXE) phase from an EFI combination library.

14. A machine readable medium as defined in claim 12, wherein the instructions to cause the machine to retrieve resources to initialize the platform from the initialization library by retrieving resources associated with one of a peripheral component interconnect (PCI) configuration space accessing function, an input/output accessing function, and a memory operation function.

15. A machine readable medium as defined in claim 12, wherein the instructions to cause the machine to execute an initialization driver associated with the initialization library in the first phase of the BIOS by executing an extensible firmware interface (EFI) combination driver in one of a pre-extensible firmware interface (PEI) phase and a driver execution environment (DXE) phase of an EFI-based BIOS.

16. A machine readable medium as defined in claim 12, wherein the instructions to cause the machine to execute an initialization driver associated with the initialization library in the second phase of the BIOS by executing an extensible firmware interface (EFI) driver in one of a driver execution environment (DXE) phase and a pre-EFI (PEI) phase of an EFI-based BIOS.

17. A machine readable medium as defined in claim 12, wherein the instructions to cause the machine to execute an initialization driver associated with the initialization library in the second phase of the BIOS by executing an extensible firmware interface (EFI) combination driver in a driver execution environment (DXE) phase during a resume boot path of a sleep state associated with the Advanced Computer Power Interface (ACPI) protocol.

18. A machine readable medium as defined in claim 12 is one of a programmable gate array, application specific integrated circuit, erasable programmable read only memory, read only memory, random access memory, magnetic media, and optical media.

19. A processor system comprising:
a dynamic random access memory (DRAM);
an initialization library stored in the DRAM and configured to provide resources associated with a plurality of phases of a basic input/output system to initialize a platform; and
an initialization driver in communication with the initialization library, the initialization driver being configured to operate in the plurality of phases associated with the BIOS based on the resources from the initialization library.

20. A processor system as defined in claim 19, wherein the initialization library comprises an extensible firmware interface (EFI) combination library configured to provide resources associated with one of a pre-EFI (PEI) phase and a driver execution environment (DXE) phase of an EFI-based BIOS.

21. A processor system as defined in claim 19, wherein the initialization library comprises an extensible firmware interface (EFI) combination library configured to provide resources associated with one of a peripheral component interconnect (PCI) configuration space accessing function, an input/output accessing function, and a memory operation function.

22. A processor system as defined in claim 19, wherein the initialization driver comprises an extensible firmware interface (EFI) combination driver configured to operate in a pre-extensible firmware interface (PEI) phase and a driver execution environment (DXE) phase.

23. A processor system as defined in claim 19, wherein the initialization driver comprises an extensible firmware interface (EFI) driver configured to operate in a driver execution environment (DXE) phase during a resume boot path of a sleep state associated with the Advanced Computer Power Interface (ACPI) protocol.

* * * * *